United States Patent [19]

Evans

[11] Patent Number: 5,030,463

[45] Date of Patent: Jul. 9, 1991

[54] NUTRITIVE COATING FOR ANIMAL FEEDS

[75] Inventor: Jeffrey C. Evans, Maple Grove, Minn.

[73] Assignee: Cargill, Incorporated, Minneapolis, Minn.

[21] Appl. No.: 545,471

[22] Filed: Jun. 27, 1990

Related U.S. Application Data

[63] Continuation of Ser. No. 336,805, Apr. 12, 1989, abandoned, which is a continuation-in-part of Ser. No. 209,849, Jun. 22, 1988, abandoned.

[51] Int. Cl.$^5$ ................................................ A23K 1/02
[52] U.S. Cl. ..................... 426/309; 426/74; 426/623; 426/630; 426/658; 426/807
[58] Field of Search ............... 426/93, 74, 658, 302, 426/309, 630, 807, 623

[56] References Cited

U.S. PATENT DOCUMENTS

| | | | |
|---|---|---|---|
| 2,102,650 | 12/1937 | Schmidt | 426/309 |
| 2,319,579 | 5/1943 | Black | 426/96 |
| 3,830,941 | 8/1974 | Luft | 426/93 |
| 3,859,448 | 1/1975 | Hettrick | 426/807 |
| 3,868,471 | 2/1975 | Decelles et al. | 426/93 |
| 3,959,498 | 5/1976 | Lyall et al. | 426/93 |
| 4,055,667 | 10/1977 | Linton et al. | 426/807 |
| 4,089,979 | 5/1978 | Jackson | 426/69 |
| 4,640,837 | 2/1987 | Coleman et al. | 426/93 |

OTHER PUBLICATIONS

Chen, "Cane Sugar Handbook", John Wiley & Sons, New York, 1985, pp. 436, 438 and 440.

Primary Examiner—R. B. Penland
Attorney, Agent, or Firm—Fitch, Even, Tabin & Flannery

[57] ABSTRACT

The invention is a coating for animal feeds; more particularly a coating composition comprising cane molasses for animal feeds which provides a golden brown color and free-flow characteristics to such feeds. The invention discloses that when cane molasses or cane molasses/fat is treated with phosphoric acid, phosphate or polyphosphate salts, or various acids, the resulting composition provides a golden brown color, improves the free-flow characteristics, and improves tackiness retention of the feed to which it is applied. Addition of an emulsifier to a cane molasses/fat coating composition eliminates spottiness.

12 Claims, No Drawings

NUTRITIVE COATING FOR ANIMAL FEEDS

This application is a continuation of application Ser. No. 336,805 filed Apr. 12, 1989, which is a continuation-in-part of U.S. patent application Ser. No. 209,849, filed on June 22, 1988 now abandoned.

The present invention relates to coatings for animal feeds, and more particularly, to a coating composition comprising cane molasses for animal feeds which provides a golden brown color and free-flow characteristics to such feeds.

BACKGROUND OF THE INVENTION

Cane molasses, a by-product from the manufacture of sugar (sucrose), is widely used in connection with animal feeds. The cane molasses is much relished by livestock and thereby adds to feed palpability even when feedstuffs not highly favored are used. In addition, the cane molasses acts as a binder for the feed, prevents dusting, serves as an economical and convenient source of carbohydrates, is an excellent source of the niacin and pantothenic acid needed for metabolism and growth in some animals that do not manufacture them, and also has a mild laxative effect that is beneficial when other feeds are constipating. The cane molasses is often applied as a coating, by spraying as a liquid solution, to the feed to improve the appearance of the product. However, when cane molasses is applied by itself to the feed, it gives a dark brown spotted appearance and also causes the feed to clump together and harden, which can make handling of the feed difficult. Fats, which are desirable for animal nutrition as a concentrated source of energy and as an aid in the adsorption of vitamin A and carotene, improve the free-flow characteristics of the feed, but also reduce feed retention/tackiness and do not eliminate the spottiness of the feed. (Fat addition actually increases the spottiness.)

An object of this invention is to further improve the appearance and free-flow characteristics of the feed while at the same time improving the retention tackiness, sheen, coating uniformity and color characteristics of the feed. A particular feature of this invention is that the feed to which the coating composition of the invention is applied acquires a uniform golden brown color instead of a spotted dark brown color.

DESCRIPTION OF THE INVENTION

This invention relates to a coating composition useful in improving the appearance, especially the color, and free-flow characteristics of animal feeds. It has been found that when phosphoric acid, phosphate and polyphosphate salts, and various acids are added to a 5 percent cane molasses solution in water, the color of the solution will change from dark brown to orange when the pH falls below about 5.5, depending on the specific acid or salt that is used. Further, when the treated cane molasses solution is applied to an animal feed, the resulting feed product develops a uniform golden brown color rather than a spotted, dark brown color usually obtained when cane molasses is added to the feed; and the free-flow characteristics are improved even when compared to untreated cane molasses solutions containing fat. The addition of fats such as soybean oil, tallow or soybean soapstock does not inhibit the formation of the orange color in the molasses solution or the golden brown color of the feed, although the pH may have to be adjusted somewhat lower than if the fats are not present. Further, when fats are used in the cane molasses solution, an emulsifier should be added in order to assure uniformity of color.

The mechanism by which the addition of phosphoric acid, phosphate or polyphosphate salts, or various acids causes a 5 percent cane molasses solution to turn orange and give better free-flow characteristics and a uniform golden brown color upon application to feed is not clearly understood. However, it is believed that there is a reaction between the acids or acid salts and the color bodies that are present in the molasses, and that charge transfer complexes are formed between the color bodies or their derivatives and the anions of the acids or acid salts.

The brown pigments (melanoidins) present in molasses arise from the processing of sugar cane and are a complex mixture of compounds resulting from the condensation of an amine and a reducing group. In addition, molasses contains a number of polycarboxylic acids, the most important of which is aconitic acid, that are highly reactive. These acids can self-condense under heat to form acid anhydrides which are themselves highly reactive, or they can react with amine or hydroxyl groups to form polymers. Further complicating the problem is that the sugars in molasses—sucrose, dextrose and levulose—can dehydrate and polymerize (caramelize). Some carbon-carbon double bond formation may be expected during the dehydration/polymerization of sugars. If the double bonds are conjugated with themselves or with other species such a carbonyl group, this will further add to the color bodies.

The addition of phosphoric acid, or a phosphate or polyphosphate salt, to a cane molasses solution probably decolorizes it by acid hydrolysis and the formation of some phosphate salts. Phosphoric acid and its salts possess a number of properties which are not found in other mineral acids. The acid does not hydrolyze to the $PO_4^{-3}$ anion except in strongly basic solution and tribasic salts such as $Na_3PO_4$ hydrolyze to hydrophosphate ions such as $HPO_4^{-2}$. In solution, therefore, phosphate ions usually have at least one proton associated with the ion which can be used to acid catalyze hydrolysis while the substrate undergoing hydrolysis is associated with the ion. (In this Specification, however, the term phosphate will be used collectively to describe all anionic forms. If a particular anion is referred to, it will be specifically described).

A second property of the phosphate ion which may be important in the hydrolysis is the relative ease with which phosphate can change from a four-coordinate tetrahedral structure to a five-coordinate trigonal bipyramidal structure. The change is a simple upward flexing of three of the tetrahedral bonds from the tetrahedral angle of 109.5 degrees to trigonal planar angle of 120 degrees. This easy transition opens a fifth coordination site which can coordinate with some functional group on one of the color bodies. In contrast, a sulfate ion must change from a tetrahedral structure to an octahedral one in order to expand its coordination sphere. This requires squeezing the tetrahedral bond from 109.5 degrees to 90 degrees in the plane of the octahedral complex. This is a energetically unfavorable process.

A third unique property possessed by phosphate ions is that when carbon-oxygen-phosphorus (C—O—P) bonds are formed, they can be cleaved either between carbon and oxygen, or between oxygen and phosphorus. The dual cleavage path, when coupled with the fact that the phosphorus-oxygen double bond (P=O) of the phosphate group can be used to coordinate with the organic species present to form P—O—C bonds, increases the possible hydrolysis pathways.

The fact that the phosphate ions offer a number of low energy pathways for hydrolyzing the color bodies present in cane molasses solutions probably accounts for the fact that the desired orange color can be obtained at higher pH values when phosphate solutions are used than when other acids are used. Further support for a catalytic role by phosphate salts in hydrolyzing the cane molasses color bodies, as opposed to a brute force mechanism by other acids, comes from the biochemical reaction of adenosine triphosphate (ATP) with sucrose—a storage sugar. In this biochemical reaction, the ATP cleaves the sucrose to form glucose and fructose phosphates, while the ATP itself is changed to adenosine diphosphate (ADP). Subsequent reactions in which phosphate plays a role result in the hydrolysis of the sugars to provide energy.

Tackiness retention is a desirable quality of animal feeds with cane molasses. It is noted that applying phosphate to a cane molasses-only solution causes a reduction in the tackiness retention properties. While the exact reason for the reduction is uncertain, it is believed to be related to the breakup of the caramelized sugars. On the other hand, adding phosphate to feeds containing fat improves tackiness retention by reducing the molecular weight of the fat and/or hydrolyzing esters that may be present. The two reactions are competing. Moisture retention is another desirable quality for animal feeds with added cane molasses.

In an important embodiment of the present invention, the moisture retention and tackiness retention of the coated animal feed of the invention are substantially improved by the addition of a divalent cation selected from magnesium and calcium to the coating compositions of the invention. It should be understood that this addition of divalent cation is a supplement to any divalent cation that may be provided by any of the principal components of the coating composition, such as molasses. It has been found that the addition of the divalent cation can improve the moisture retention of the animal feed by a factor of up to about 40 percent when the divalent cation is added to the coating composition, at a level of from about 0.05 percent to about 2.0 percent by weight. Higher levels can be used but no further benefit is provided by use of such higher levels. The divalent cation is preferably added to the coating composition in the form of a suitable salt, such as a chloride salt.

The examples which follow are for the purpose of illustrating the invention and are in no manner meant to be limiting. The objective is to demonstrate the effect of the addition of phosphate, from 75 percent phosphoric acid or from phosphate salts, to cane molasses and cane molasses/fat blends on the appearance of coated textured feed (color, tackiness retention). Another object is to demonstrate the effect of adding a divalent cation on tackiness retention and moisture retention. In general, the coating composition for animal feed comprises a composition made from cane molasses having a Brix of between about 79.4 and 84; and a solids content between about 65 and about 75 percent; a pH between about 3.0 and 5.5; and a total phosphorus content between about 0.03 percent and 3.0 percent. The coating composition can also have a fat content between about 1 percent and about 10 percent, and can include an emulsifier. The coating compositions can also have a divalent cation selected from magnesium and calcium at a level of from between 0.05 percent and 2.0 percent by weight. An animal feed, comprising cracked and whole grain, is coated with the composition at a level of between about 3 percent and 15 percent by weight of the feed.

EXAMPLE 1

Phosphoric acid, 75 percent by weight, was added to cane molasses, or cane molasses with approximately 5 percent added fat, the cane molasses having a Brix of about 79.5 and a solids content of about 73%. The fat may be tallow, refined soybean oil, or raw soybean soapstock. The molasses or molasses/fat blends were standardized to approximately 73 percent solids. The coating composition was applied to a 42.5% cracked corn/42.5% whole oats/15% soybean meal texturized feed at a rate of 10% by weight of the feed and was stored at room temperature in 3-ply paper bags for 24 hours before evaluation. Samples were evaluated in terms of color and tackiness retention. Color was evaluated by visual observation, with a golden brown color being desired as compared to a dark brown color. Feed tackiness retention is a measure of the feed stickiness, with greater stickiness (as indicated by increasing tackiness retention number values) being preferred. The coating composition was sprayed on the textured feed using standard molasses spraying equipment. Color and tackiness retention values are shown in Table 1.

TABLE 1

| Total PO₄ Added % | Total PO₄ (molasses + added) % | Total P (molasses + added) % | Color | Tackiness Retention |
|---|---|---|---|---|
| 1. Cane Molasses | | | | |
| 0 | 0.08 | 0.03 | Dark Brown | 49.0% |
| 1.5 | 1.6 | 0.5 | Golden Brown | 45.0% |
| 3.1 | 3.2 | 1.0 | Golden Brown | 47.5% |
| 4.6 | 4.7 | 1.5 | Golden Brown | 40.5% |
| 6.1 | 6.2 | 2.0 | Golden Brown | 37.5% |
| 2. Cane Molasses/Tallow (5.3 percent) | | | | |
| 0 | 0.16 | 0.05 | Dark Brown | 28.5% |
| 1.5 | 1.7 | 0.60 | Golden Brown | 36.0% |
| 3.1 | 3.3 | 1.1 | Golden Brown | 35.5% |
| 4.6 | 4.8 | 1.6 | Golden Brown | 37.5% |
| 6.1 | 6.3 | 2.1 | Golden Brown | 30.5% |
| 3. Cane Molasses/Soybean Oil (5.3 percent) | | | | |
| 0 | 0.2 | 0.05 | Dark Brown | 42.5% |
| 1.5 | 1.7 | 0.60 | Golden Brown | 43.0% |
| 3.1 | 3.3 | 1.1 | Golden Brown | 45.5% |
| 4.6 | 4.8 | 1.6 | Golden Brown | 45.0% |
| 6.1 | 6.3 | 2.1 | Golden Brown | 43.0% |
| 4. Cane Molasses/Soybean Soapstock (5.3 percent) | | | | |
| 0 | 0.2 | 0.05 | Dark Brown | 29.0% |
| 1.5 | 1.7 | 0.60 | Golden Brown | 31.0% |
| 3.1 | 3.3 | 1.1 | Golden Brown | 34.0% |
| 4.6 | 4.8 | 1.6 | Golden Brown | 35.0% |
| 6.1 | 6.3 | 2.1 | Golden Brown | 37.0% |

Conclusion
Addition of PO₄ to cane molasses and cane molasses/fat provides a golden brown color to the feed and increases feed tackiness retention.

EXAMPLE 2

These experiments were conducted to determine the effect of the addition of phosphate to cane molasses or cane molasses/fat blends on coated feed anticaking characteristics. In a typical experiment, phosphoric acid, 75 percent by weight, was added to cane molasses or cane molasses with approximately 5 percent added fat from either tallow, refined soybean oil or raw soybean soapstock. The molasses or molasses/fat blends were standardized to approximately 73.0 percent solids. The resulting composition was applied to 42.5% cracked corn/42.5% whole oats/15% soybean meal textured feed at a 10 wt. % application rate. The resulting feed samples were stored in 3-ply paper bags at 40° F. for 24 hours before evaluation. The samples were evaluated in terms of anticaking (free-flow) characteristics by measuring retention of the feed block through a Number 4 mesh sieve following 1 minute hand shaking. A lower degree of sieve retention is preferred and is indicated by lower sieve retention values. The results of the anticaking tests are shown in Table 2.

TABLE 2

Anticaking Characteristics

| Total $PO_4$ Added % | Total $PO_4$ (molasses + added) % | Total P (molasses + added) % | Sieve Retention |
|---|---|---|---|
| 1. Cane Molasses | | | |
| 0 | 0.08 | 0.03 | 23.1% |
| 1.5 | 1.6 | 0.50 | 14.3% |
| 3.1 | 3.2 | 1.0 | 17.8% |
| 4.6 | 4.7 | 1.5 | 17.4% |
| 6.1 | 6.2 | 2.0 | 14.4% |
| 2. Cane Molasses/Tallow (5.3 percent) | | | |
| 0 | 0.16 | 0.05 | 15.9% |
| 1.5 | 1.7 | 0.60 | 17.3% |
| 3.1 | 3.3 | 1.1 | 15.3% |
| 4.6 | 4.8 | 1.6 | 14.7% |
| 6.1 | 6.3 | 2.1 | 14.0% |
| 3. Cane Molasses/Soybean Oil (5.3 percent) | | | |
| 0 | 0.2 | 0.05 | 21.4% |
| 1.5 | 1.7 | 0.60 | 20.8% |
| 3.1 | 3.3 | 1.1 | 18.2% |
| 4.6 | 4.8 | 1.6 | 15.8% |
| 6.1 | 6.3 | 2.1 | 14.3% |
| 4. Cane Molasses/Soybean Soapstock (5.3 percent) | | | |
| 0 | 0.2 | 0.05 | 22.0% |
| 1.5 | 1.7 | 0.60 | 21.3% |
| 3.1 | 3.3 | 1.1 | 20.5% |
| 4.6 | 4.8 | 1.6 | 18.1% |
| 6.1 | 6.3 | 2.1 | 17.5% |

Conclusion:
Addition of $PO_4$ can improve feed anticaking characteristics of textured feed coated with molasses or molasses/fat blends by allowing the feed aggregations to break apart more easily thereby improving feed handling characteristics.

EXAMPLE 3

Runs were conducted for the purpose of evaluating the mechanism for providing the golden brown color of coated feed. It was found that the addition of 3.1% by weight of phosphate ($PO_4^=$) to cane molasses, with or without added fat, or adjusting the pH of a cane molasses solution (5% in water) to a pH between approximately 5.0 and about 3.0 produced an orange colored solution indicating a golden brown color after the composition was applied to feed. When fat is added to the cane molasses, lower pH values should be reached before the solution will produce a golden brown feed. In addition, it was found that use of phosphate salts produce the golden brown color at a higher pH than can be produced using various acids. The results of these experiments are set forth in Table 3. In all cases, the additives are added to the cane molasses. The resulting cane molasses-additive mixture is then used to prepare a 5% aqueous solution to determine color.

TABLE 3

| Treatment | pH | 5% Liquid Solution Color | Coated Whole Oats |
|---|---|---|---|
| 1. $BCM^a$ | NA | Dark Brown | Dark Brown |

TABLE 3-continued

| Treatment | pH | 5% Liquid Solution Color | Coated Whole Oats |
|---|---|---|---|
| 2. $BCM^a$ + 3.15 $NaCl^b$ | NA | Dark Brown | Dark Brown |
| 3. $BCM^a$ + 3.15 $CaCl_2$ | NA | Dark Brown | Dark Brown |
| 4. $BCM^a$ + $(NH_4)_2SO_4$NA | | Dark Brown | Dark Brown |
| 5. $BCM^a$ + $Na_2SO_4$ | NA | Dark Brown | Dark Brown |
| 6. $BCM^a$ + 4.2 $H_3PO_4$ | 3.5 | Orange | Golden Brown |
| 7. $BCM^a$ 6.8 Ammonium polyphosphate | 4.9 | Orange | Golden Brown |
| 8. $BCM^a$ + 4.0 Sodium tripolyphosphate | 5.1 | Orange | Golden Brown |
| 9. $BCM^a$ + 3.9 Sodium phosphate | 4.5 | Orange | Golden Brown |
| 10. $BCM^a$ + 3.3 Sodium hexametaphosphate | 4.8 | Orange | Golden Brown |
| 11. $BCM^a$ + 5.3 Soybean oil | NA | Dark Brown | Dark Brown |
| 12. $BCM^a$ + 5.3 Soybean oil and 4.2 $H_3PO_4$ | 3.6 | Orange | Golden Brown |
| 13. $BCM^a$ + 5.3 Tallow | NA | Dark Brown | Dark Brown |
| 14. $BCM^a$ + 5.3 Tallow and 4.2 $H_3PO_4$ | 3.6 | Orange | Golden Brown |
| 15. $BCM^a$ + $H_2SO_4$ | 4.5 | Dark Brown | Dark Brown |
| 16. $BCM^a$ + $H_2SO_4$ | 4.0 | Light Brown | Golden Brown |
| 17. $BCM^a$ + $H_2SO_4$ | 3.5 | Orange | Golden Brown |
| 18. $BCM^a$ + 5.3 Soybean oil and $H_2SO_4$ | 3.5 | Orange | Golden Brown |

$^a$ = 79.5 Brix Cane Molasses, 73% solids.
$^b$ = All additives are in weight percent of cane molasses.

EXAMPLE 4

It was found that when fat was added to cane molasses, the resulting composition produced a spotted feed. Further, if the cane molasses/fat mixtures were treated to a pH below approximately 4.5, the fat separation occurred. Again, a spotted feed was produced. It was found that adding an emulsifier, such as Polysorbate 60 (PS-60) to the cane molasses/fat mixture in conjunction with phosphoric acid, spotting was eliminated and produced a uniformly coated feed. Runs including the addition of an emulsifier are shown in Table 4. It is noted that in Runs 6 and 7 that soybean oil and phosphoric acid, or soybean oil and emulsifier both produced a spotted acid. If fat is added to the cane molasses, a uniformly coated feed is produced only when both phosphoric acid and emulsifier are added.

TABLE 4

| | Treatment | Feed Appearance |
|---|---|---|
| 1. | $BCM^a$ | Uniform |
| 2. | $BCM^a$ + 4.2 $H_3PO_4^b$ | Uniform |
| 3. | $BCM^a$ + 0.1 PS-60 | Uniform |
| 4. | $BCM^a$ + 4.2 $H_3PO_4$ and 0.1 PS-60 | Uniform |
| 5. | $BCM^a$ + 5.3 Soybean oil | Spotted |
| 6. | $BCM^a$ + 5.3 Soybean oil and 4.2 $H_3PO_4$ | Spotted |
| 7. | $BCM^a$ + 5.3 Soybean oil and 0.1 PS-60 | Spotted |
| 8. | $BCM^a$ + 5.3 Soybean oil and 4.2 $H_3PO_4$ and 0.1 PS-60 | Slightly Spotted |
| 9. | $BCM^a$ + 5.3 Soybean oil and | Uniform |

TABLE 4-continued

| Treatment | Feed Appearance |
|---|---|
| 4.2 H₃PO₄ and 0.2 PS-60 | |

BCM = 79.5 Brix Cane Molasses, 73% solids.
All additives are in weight percent of cane molasses.

EXAMPLE 5

It has been found that when a divalent cation, such as magnesium or calcium is added to the coating compositions that moisture retention and tackiness retention is greatly improved. In this example, it is shown that the addition of magnesium in the form of magnesium chloride or calcium in the form of calcium chloride to the coating composition increases coated feed stickiness about 10–20 percent. It has been determined that feed stickiness correlates closely to feed moistness. As coated feed increases in moistness (as felt to the touch) it also increases in stickiness. The stickiness can be measured and assigned an analytic value by a procedure wherein samples of coated feed (200 grams) are placed in 5-ply paper bags and stored 24 hours at 40° F. This causes the coated feed to stick together and form a block. The feed blocks are placed in a number 4 sieve and hand shaken for 60 seconds. The amount of the feed which remains on the sieve is weighed and the remaining amount is expressed as a percentage of the 200 gram starting amount.

Samples of a nutritive feed coating composition having the following formulation were prepared:

| Ingredient | % By Weight |
|---|---|
| Molasses (83.4 Brix) | 86.6 |
| Soybean soapstock | 10.7 |
| Phosphoric acid (75%) | 1.5 |
| Propionic acid | 1.2 |

Various levels of magnesium chloride hexahydrate or calcium chloride dihydrate were added at various levels to samples of the feed coating composition as indicated in Tables 5 and 6 hereinbelow. The feed coating compositions were mixed at a level of 10 percent by weight to a textured feed containing 42.5 percent whole oats, 42.5 percent cracked corn and 15 percent pellets until uniformly coated. The stickiness of each sample was then measured by the above described method and is reported in Tables 5 and 6.

TABLE 5

| Formulas: | Control 1 | 2 | 3 | 4 | 5 | 6 |
|---|---|---|---|---|---|---|
| Feed Coating Composition | 100.0 | 99.5 | 99.0 | 98.0 | 97.0 | 96.5 |
| Magnesium Chloride | 0.0 | 0.5 | 1.0 | 2.0 | 3.0 | 3.5 |
| Hexahydrate | 100.0 | 100.0 | 100.0 | 100.0 | 100.0 | 100.0 |
| Added Magnesium Chloride | 0.00 | 0.23 | 0.47 | 0.94 | 1.41 | 1.64 |
| Added Magnesium | 0.00 | 0.06 | 0.12 | 0.24 | 0.36 | 0.42 |
| Total Magnesium Content | 0.32 | 0.38 | 0.44 | 0.56 | 0.68 | 0.74 |

| Data: | 1 | 2 | 3 | 4 | 5 | 6 |
|---|---|---|---|---|---|---|
| Test #1 | 81.0 | 80.6 | 79.1 | 84.3 | 86.9 | 89.1 |
| Test #2 | 80.6 | 95.4 | 89.7 | 91.0 | 92.3 | 92.7 |
| Test #3 | 63.0 | 72.1 | 76.8 | 74.6 | 76.8 | 89.9 |
| Average | 74.9 | 82.7 | 81.9 | 83.3 | 85.3 | 90.6 |
| % Relative to Control | 100.0 | 110.4 | 109.3 | 111.2 | 113.4 | 121.0 |

TABLE 6

| Formulas: | Control 6 | 7 | 8 | 9 | 10 | 11 |
|---|---|---|---|---|---|---|
| Feed Coating Composition | 100.00 | 99.69 | 99.37 | 98.75 | 98.12 | 97.81 |
| Calcium Chloride | 0.00 | 0.31 | 0.63 | 1.25 | 1.88 | 2.19 |
| Dihydrate | 100.00 | 100.00 | 100.00 | 100.00 | 100.00 | 100.0 |
| Added Calcium Chloride | 0.00 | 0.23 | 0.48 | 0.94 | 1.42 | 1.65 |
| Added Calciu | 0.00 | 0.08 | 0.17 | 0.34 | 0.51 | 0.61 |
| Total Calcium Content | 0.72 | 0.80 | 0.89 | 1.05 | 1.22 | 1.30 |

| Data: | 6 | 7 | 8 | 9 | 10 | 11 |
|---|---|---|---|---|---|---|
| Test #1 | 74.9 | 71.9 | 79.1 | 91.9 | 94.0 | 91.8 |
| % Relative to Control | 100.0 | 96.0 | 105.6 | 121.6 | 125.5 | 122.6 |

Conclusion
Addition of magnesium or calcium to the nutritive animal feed coating compositions of the present invention causes the coated feed to stick together approximately 10–20 percent more than the control which did not contain magnesium or calcium, thus providing a more moist feel to the touch.

What is claimed is:

1. A method for coating a cracked or whole grain animal feed to provide a feed with uniform golden brown color and with free-flow characteristics, the method comprising providing a coating composition consisting essentially of cane molasses having a Brix of between about 70.5 and about 84, said coating composition having a solids content between about 65 percent and about 75 percent and a pH of between about 3.0 and 5.5, said pH being adjusted to within said range of about 3.0 and 5.5 with a pH adjusting reagent selected from the group consisting of phosphoric acid, phosphate salts, polyphosphate salts and sulphuric acid and applying a uniform coat of said coating composition to the animal feed, said coating composition being applied at a level of from about 3 percent to about 15 percent by weight of said animal feed.

2. A method in accordance with claim 1 wherein said coating composition comprises fat at between about 1 percent and about 10 percent and an emulsifier suitable for use in animal feed.

3. A method in accordance with claim 2 wherein said coating composition further comprising a divalent cation selected from the group consisting of magnesium and calcium.

4. A method in accordance with claim 3 wherein said divalent cation is present at a level of from about 0.05 percent to about 2.0 percent by weight.

5. A method in accordance with claim 3 having a total phosphorous content of between about 0.03 percent and about 3.0 percent.

6. A method in accordance with claim 1 wherein said pH adjusting agent is selected from the group consisting of phosphoric acid, phosphate salts and polyphosphate salts, the coating composition further comprising an emulsifier suitable for use in animal feed.

7. A method in accordance with claim 6 having a total phosphorous content of between about 0.03 percent and about 3.0 percent.

8. A method in accordance with claim 1 wherein said coating composition further comprises an emulsifier suitable for use in food products.

9. A method in accordance with claim 1 wherein said coating composition comprises a divalent cation selected from the group consisting of magnesium and calcium.

10. A method in accordance with claim 9 wherein said divalent cation is present at a level of from about 0.05 percent to about 2.0 percent by weight.

11. A method in accordance with claim 9 having a total phosphorous content of between about 0.03 percent and about 3.0 percent.

12. A method in accordance with claim 1 wherein said molasses has a Brix of between about 79.5 and about 84 and a solids content of between about 65 percent and about 75 percent.

* * * * *

UNITED STATES PATENT AND TRADEMARK OFFICE
CERTIFICATE OF CORRECTION

PATENT NO. : 5,030,463
DATED : July 9, 1991
INVENTOR(S) : Evans

It is certified that error appears in the above-identified patent and that said Letters Patent is hereby corrected as shown below:

IN THE SPECIFICATION:

Column 3, line 44, delete the comma after "composition".
Column 6, line 52, change "acid" to --feed--.
Column 7, line 5 under TABLE 5, "Hexahydrate is a part of "Magnesium Chloride" and should not be on the same line with the totals.
Column 8, line 4, "Dihydrate" is part of "Calcium Chloride" and should not be on the same line with the totals.
Column 8, line 4, under column "11", the total should be --100.00--, not "100.0".
Column 8, line 6, under column "11", change "0.61" to --0.60--.

IN THE CLAIMS:

Claim 1, column 8, line 24, after "range of" insert --between--.
Claim 1, column 8, line 21, after "between about" delete "70.5" and insert -- 79.5 --.
Claim 3, column 8, line 36, change "comprising" to --comprises--.

Signed and Sealed this

Tenth Day of December, 1991

Attest:

HARRY F. MANBECK, JR.

Attesting Officer — Commissioner of Patents and Trademarks